United States Patent
Dixon et al.

(10) Patent No.: US 6,848,250 B2
(45) Date of Patent: Feb. 1, 2005

(54) FUEL INJECTION SYSTEM FOR A COMBUSTION ENGINE

(75) Inventors: Glyn Edward Dixon, Cheltenham (GB); Philip Laurence Elliott, Birmingham (GB)

(73) Assignee: Goodrich Control Systems Ltd. (GB)

( * ) Notice: Subject to any disclaimer, the term of this patent is extended or adjusted under 35 U.S.C. 154(b) by 77 days.

(21) Appl. No.: 10/371,989

(22) Filed: Feb. 21, 2003

(65) Prior Publication Data
US 2003/0172641 A1 Sep. 18, 2003

(30) Foreign Application Priority Data
Feb. 21, 2002 (GB) ............................................. 0204054

(51) Int. Cl.[7] ................................................. F02C 9/28
(52) U.S. Cl. ...................... 60/39.281; 60/74.6
(58) Field of Search .............................. 60/39.281, 734, 60/746–747

(56) References Cited

U.S. PATENT DOCUMENTS

| | | |
|---|---|---|
| 4,597,407 A | 7/1986 | Smith |
| 4,606,191 A | 8/1986 | Collins et al. |
| 4,817,375 A | 4/1989 | Brocard et al. |
| 5,448,882 A * | 9/1995 | Dyer et al. .............. 60/39.281 |
| 5,845,484 A | 12/1998 | Maker |
| 5,881,550 A * | 3/1999 | Toelle ......................... 60/739 |
| 5,916,126 A * | 6/1999 | Szillat et al. ................. 60/778 |

* cited by examiner

*Primary Examiner*—Louis J. Casaregola
(74) *Attorney, Agent, or Firm*—Andrus, Sceales, Starke & Sawall, LLP

(57) ABSTRACT

According to the present invention there is provided a fuel injection system for a combustion engine, comprising:

a fuel metering unit for providing a metered supply of pressurized fuel, at least one first fuel injector, at least one second fuel injector, a fuel supply passage arrangement for supplying fuel from the fuel metering unit to the at least one first fuel injector and the at least one second fuel injector. The fuel supply passage arrangement including a first valve for controlling the flow of fuel from the fuel metering unit to the at least one second fuel injector. The first valve having a fuel inlet communicating with the fuel metering unit, a fuel supply outlet communicating with the at least one second injector.

14 Claims, 4 Drawing Sheets

FUEL INJECTION SYSTEM FOR A COMBUSTION ENGINE

TECHNICAL FIELD

This invention relates to a fuel injection system for a combustion engine, particularly but not exclusively a gas turbine engine.

BACKGROUND ART

In staged combustion gas turbine engines, the arrangement of the injectors commonly includes a set of pilot injectors, which are on at all times when the engine is running, and one or more sets of main injectors, which are fired in stages as thrust demand increases. Ideally, the system controlling the supply of fuel to the injectors should have the ability to maintain the rate of fuel flow to each set of injectors, even when the flow to other sets is changing. Problems can arise with control systems as a reduction in flow can occur in the fuel supply to a first set of main injectors when a further set of main injectors is switched on.

In staged combustion gas turbine engines, it is also a requirement to be able to purge with air the part of the fuel supply path to a set of injectors exposed to high ambient temperatures when the injectors are switched off, otherwise the paths are liable to block as a result of solid carbon particles forming in the residual fuel. Furthermore, once a path has been purged it is desirable to minimise the delay that occurs in refilling the path when the injectors are next switched on.

An example of a known staged combustion gas turbine engine injector system is shown in FIG. 1. The staged combustion gas turbine engine injector system comprises a fuel metering unit 10, supplying a regulated flow of fuel under high pressure directly to a group of first stage fuel injectors 12 (only one shown), and to a group of second stage fuel injectors 14 (only one shown) through a staging valve 16.

The valve 16 comprises a fuel supply passage or inlet 18 supplied with fuel from the fuel metering unit 10, a fuel outlet 20 to supply fuel to the second stage fuel injector 14, and a valve member in the form of a piston 22 having a piston seal 22a positioned toward one end, the piston 22 being slidingly mounted in a valve chamber 23. The valve 16 further comprises a second passage 24 positioned on the opposite side of the piston 22 to the fuel supply passage 18. The second passage 24 is supplied with fuel for piston control purposes from a high-pressure fuel line 26 via a two-position ball valve 28 controlled by a solenoid 32. The valve 28 also controls the return flow of fuel from the valve chamber 23 via the second passage 24 to a low pressure fuel return path 30 leading to a low pressure fuel reservoir (not shown).

In the position illustrated in FIG. 1, the solenoid 32 is energised so that an armature 33 thereof applies a force to the ball of the ball valve 28 to urge the ball into a position in which the high pressure fuel line 26 is closed and the chamber 23 is in communication with the low pressure fuel return path 30. As a result, the high pressure fuel acting on the piston 22 via the fuel supply passage 18 has caused the piston 22 to move into the position illustrated in FIG. 1 so that high pressure fuel is supplied from the fuel metering unit 10 to the set of second stage injectors 14 via the fuel outlet 20.

When the solenoid 32 is de-energised, the force acting on the ball of the ball valve 28 by the armature 33 is released with the result that the high pressure of fuel in the line 26 moves the ball into a position in which it closes the low pressure return path 30. Since the fuel from the high-pressure fuel source 26 is at a higher pressure than that supplied from the fuel metering unit 10, the pressure variation causes the piston 22 to be positioned in the valve chamber 23 so as to prevent passage of fuel from the fuel metering unit 10 to the second stage fuel injectors 14.

The fuel metering unit 10 provides a continuous flow of fuel to the first stage injectors 12. The second stage injectors 14 are brought into operation when a greater flow of fuel is required than can be supplied by the first stage injectors 12. The flow capacity of the valve 16 is very large relative to the flow capacity of the injectors 14 so that the flow split between the injectors 12, 14 is determined by the restrictions to flow of fuel through the outlet orifices of the injectors. When the second stage injectors 14 are being primed, air rather than fuel passes through the outlet orifices. Consequently, there is no significant pressure drop across the outlet orifices and flow into these injectors is relatively unrestricted during priming. Accordingly there is a temporary reduction in flow of fuel to the first stage fuel injectors due to preferential flow to the second stage injectors whilst they are being primed. This can result in a potentially dangerous temporary loss of power or even flame extinction. This reduction in flow is exacerbated by the loss of metered fuel to the low pressure reservoir as the piston 22 is displaced to the open position.

It is an object of the invention to provide a fuel injection system for use in a combustion engine in which the aforementioned problem is alleviated.

DISCLOSURE OF INVENTION

According to a first aspect, the present invention provides a fuel injection system for a combustion engine, comprising:
 (i) a fuel metering unit for providing a metered supply of pressurised fuel,
 (ii) at least one first fuel injector,
 (iii) at least one second fuel injector,
 (iv) a fuel supply passage arrangement for supplying fuel from the fuel metering unit to said at least one first fuel injector and said at least one second fuel injector,
 said fuel supply passage arrangement including a first valve for controlling the flow of fuel from the fuel metering unit to said at least one second fuel injector,
 said first valve having a fuel inlet communicating with the fuel metering unit, a fuel supply outlet communicating with said at least one second injector, and a fuel control valve member moveable between a first position in which flow of fuel from the fuel inlet to the fuel supply outlet is prevented and a second position in which the flow of fuel from the fuel inlet to the fuel supply outlet is permitted, and
 (v) means for controlling movement of the valve member, wherein said first valve has a fuel priming outlet communicating with said at least one second fuel injector, said fuel priming outlet being positioned relative to said fuel inlet and said valve member so that (a) the flow of fuel from the fuel inlet to the priming outlet is prevented when the valve member is in its first position, and (b) the flow of fuel from the fuel inlet to the fuel priming outlet is permitted before the valve member reaches its second position.

Priming fuel is supplied, in use, to said at least one second injector before fuel is supplied thereto via said fuel supply outlet.

With such a design of valve, it will be appreciated that the sizing of the fuel priming outlet can be arranged so that the flow therethrough is sufficiently small that the reduction in fuel flow to said at least one first injector remains acceptable, whilst the required main fuel flow to said at least one second injector can be achieved via said fuel outlet port once said valve member has reached its second position. By appropriate selection of the size of the fuel priming outlet and the distance between the fuel priming outlet and the fuel supply outlet, it is possible to supply the required volume of priming fuel to said at least one second injector before fuel supply takes place via the fuel outlet port.

Preferably, said means for controlling movement of the valve member between its first position and its second position includes means for supplying pressurised fluid to an opposite side of the valve member to the fuel inlet.

Preferably, said fluid supplied to the opposite side of the valve member to the fuel inlet is fuel.

Preferably, said means for supplying pressurised fluid includes a further valve.

Preferably, said valve has at least a first port communicating with a pressurised fluid supply, and a second port communicating with the first valve.

Preferably, said valve has a third port which is capable of communicating with said second port.

Preferably, said third port further communicates with said at least one second injector.

Preferably, said further valve is controllable so that (a), in a first condition of the further valve, the third port is closed and the first port is connected to the first valve via the second port whereby, in use, the pressurised fuel from said pressurised fuel supply urges the valve member of the first valve into its first position, and (b), in a second condition of the further valve, the first port is closed and the second and third ports are in communication so that, in use, the valve member of the first valve can move from its first position to its second position and thereby displace fuel through the second and third ports to said at least one second injector during travel of the valve member towards its second position.

Also according to the present invention, there is provided a valve adapted for use with the fuel injection system according to said first aspect of the present invention, said valve comprising:

(i) a fuel inlet adapted to communicate with the fuel metering unit, (ii) a fuel supply outlet adapted to communicate with said at least one second injector, (iii) a fuel control valve member moveable between a first position in which the fuel supply outlet is closed, and a second position in which the fuel supply outlet is open, wherein said valve member has a fuel priming outlet, said fuel priming outlet being positioned relative to said fuel inlet and said valve member so that (a) the fuel priming outlet is closed when the valve member is in its first position, and (b) the fuel priming outlet is opened before the valve member reaches its second position in which the fuel supply outlet is open.

According to a second aspect, the present invention provides a fuel injection system for a combustion engine, comprising:

(i) a fuel metering unit for providing a metered supply of pressurised fuel, (ii) at least one first fuel injector, (iii) at least one second fuel injector, (iv) a fuel supply passage arrangement for supplying fuel from the fuel metering unit to said at least one first fuel injector and said at least one second fuel injector, said fuel supply passage arrangement including a first valve for controlling the flow of fuel from the fuel metering unit to said at least one second fuel injector, said first valve having a fuel inlet communicating with the fuel metering unit, a fuel supply outlet communicating with said at least one second injector, and a fuel control valve member moveable between a first position in which flow of fuel from the fuel inlet to the fuel supply outlet is prevented and a second position in which the flow of fuel from the fuel inlet to the fuel supply outlet is permitted, and (v) control means for controlling movement of the valve member, wherein the control means includes a further valve having a first port communicating in use with a pressurised fuel supply, a second port communicating with the first valve, and a third port communicating with said at least one second injector, wherein the further valve is controllable so that (a), in a first condition of the further valve, the third port is closed and the first port is connected to the first valve via the second port whereby, in use, the pressurised fuel from said pressurised fuel supply urges the valve member of the first valve into its first position, and (b), in a second condition of the further valve, the first port is closed and the second and third ports are in communication so that, in use, the valve member of the first valve can move from its first position to its second position and thereby displace fuel through the second and third ports to said at least one second injector during travel of the valve member towards its second position.

Preferably, in the fuel injection system according to either of said first and second aspects, said first valve member is in the form of a piston moveable within a piston chamber.

Preferably, said further valve is a ball valve.

Preferably, damping means is provided for damping movement of said piston from said first position to said second position.

Preferably, a line connecting said second port with the first valve control member contains a flow restriction. Said flow restriction acts as said damping means.

Said flow restriction may be a unidirectional flow restriction.

Preferably, the fuel control system further includes means for changing the condition of said further valve.

BRIEF DESCRIPTION OF DRAWINGS

An embodiment of the present invention will now be described, by way of example only, with reference to the accompanying drawings in which.

DETAILED DESCRIPTION OF PREFERRED EMBODIMENTS OF THE INVENTION

Figure 1:
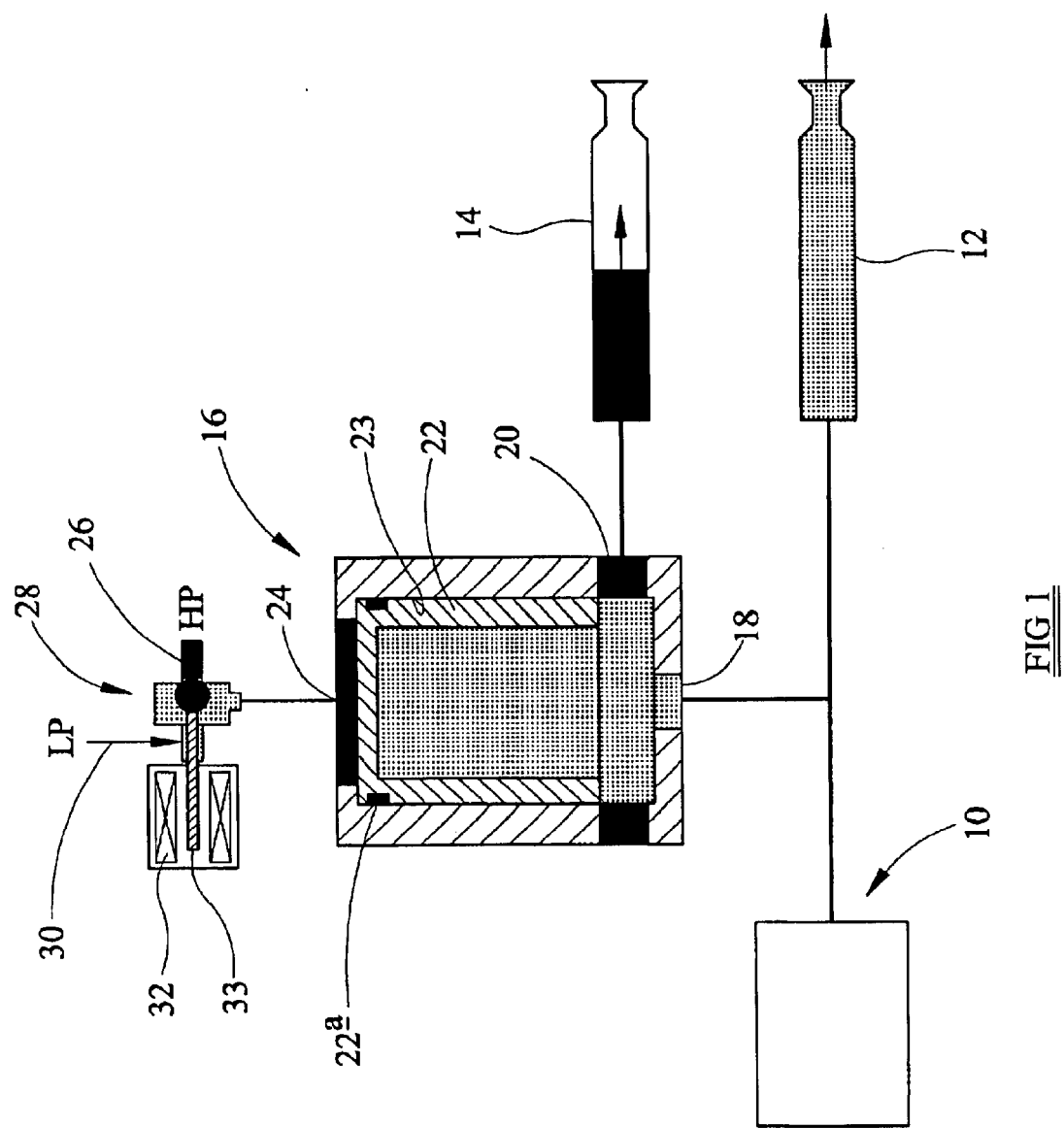
FIG. 1 is a schematic representation of a staged gas turbine engine fuel injector system containing a second stage valve according to the prior art.

In the following embodiment, some of the parts corresponding to those described above with reference to FIG. 1 will be given the same numbering.

Figure 2:
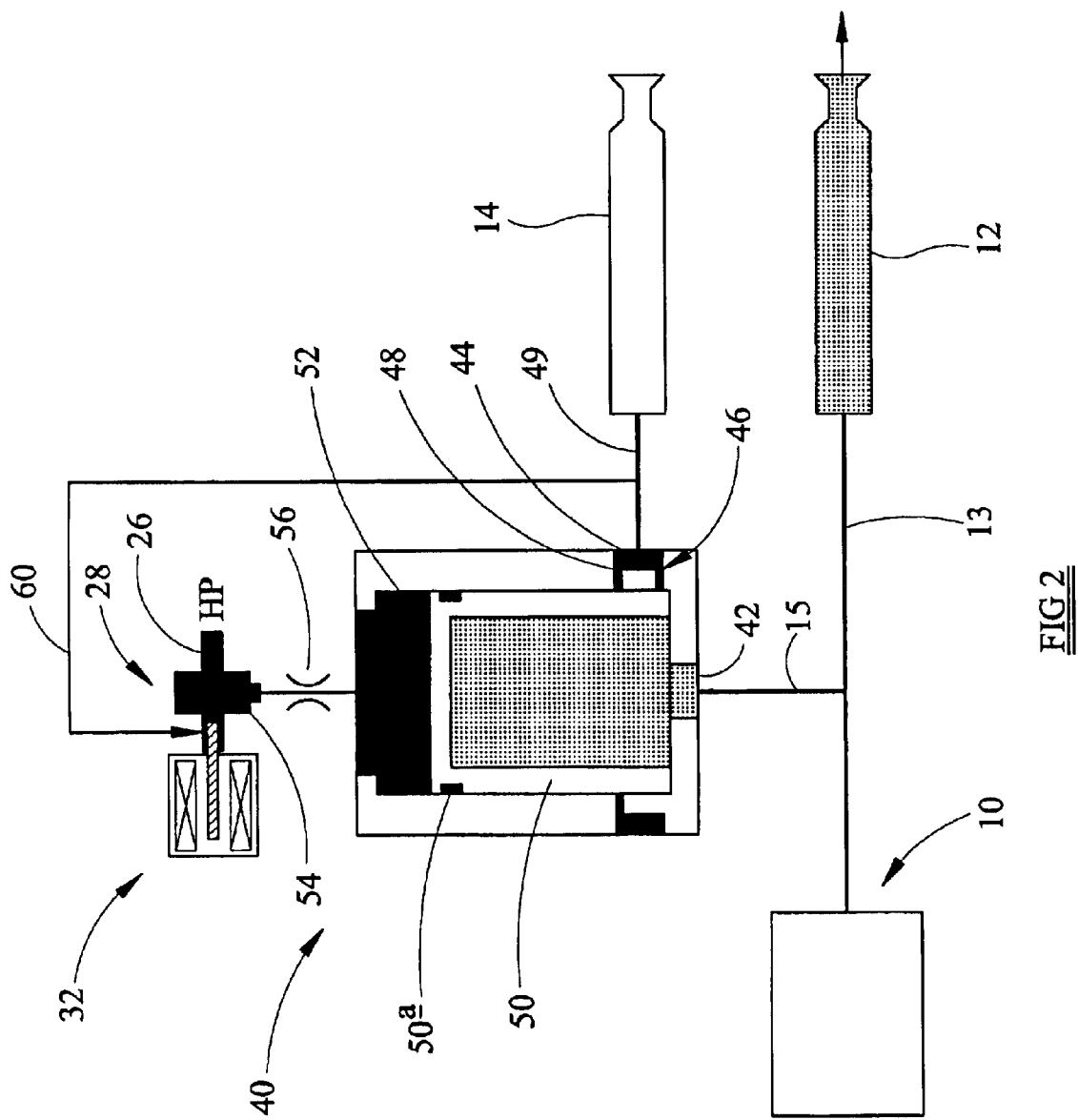
FIG. 2 is a schematic representation of a staged gas turbine engine fuel injector system according to the present invention having a second stage valve in a closed position.
Figure 3:
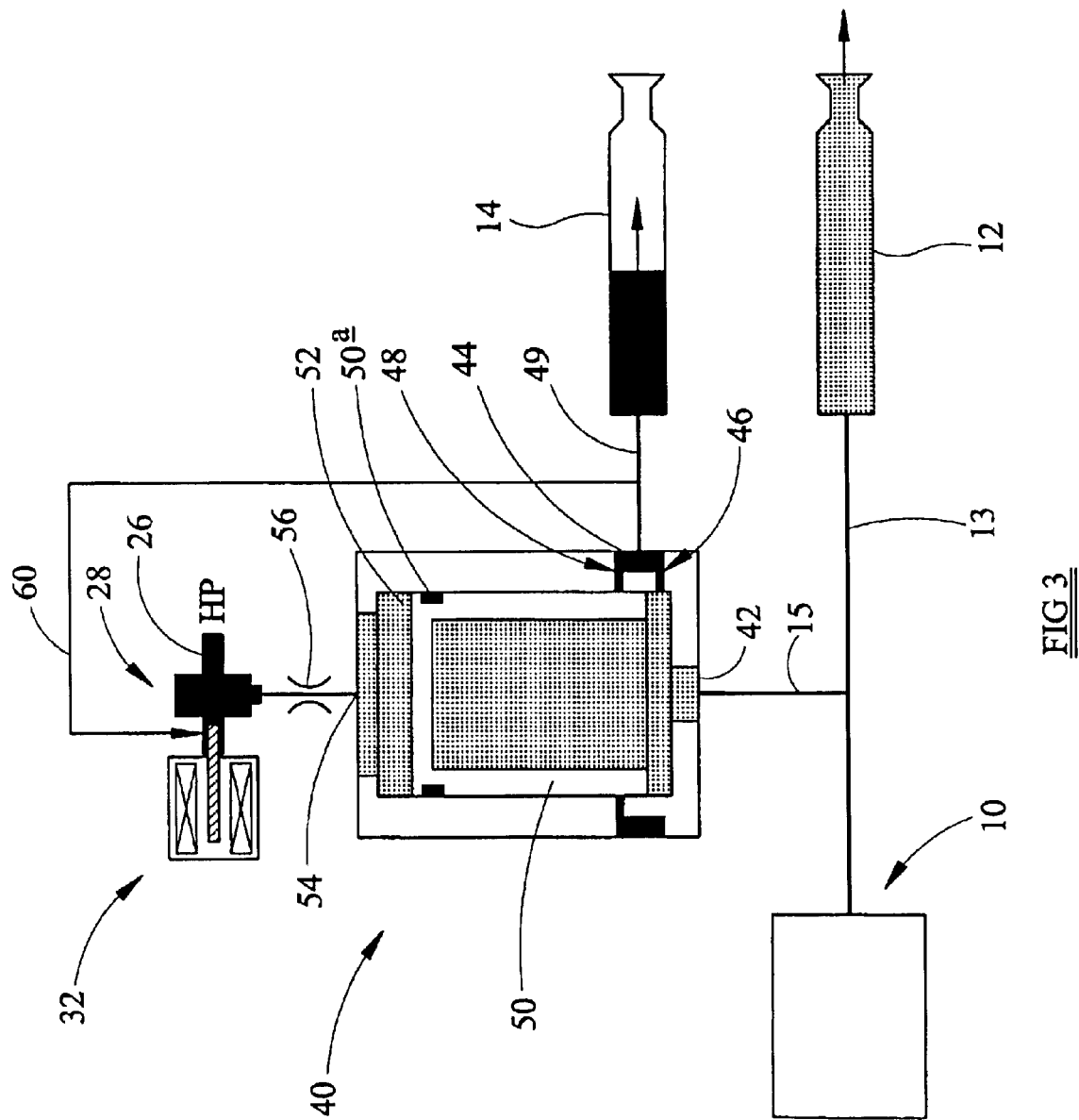
FIG. 3 is a schematic representation of a staged gas turbine engine injector system according to the present invention having a second stage valve in an intermediate open position.
Figure 4:
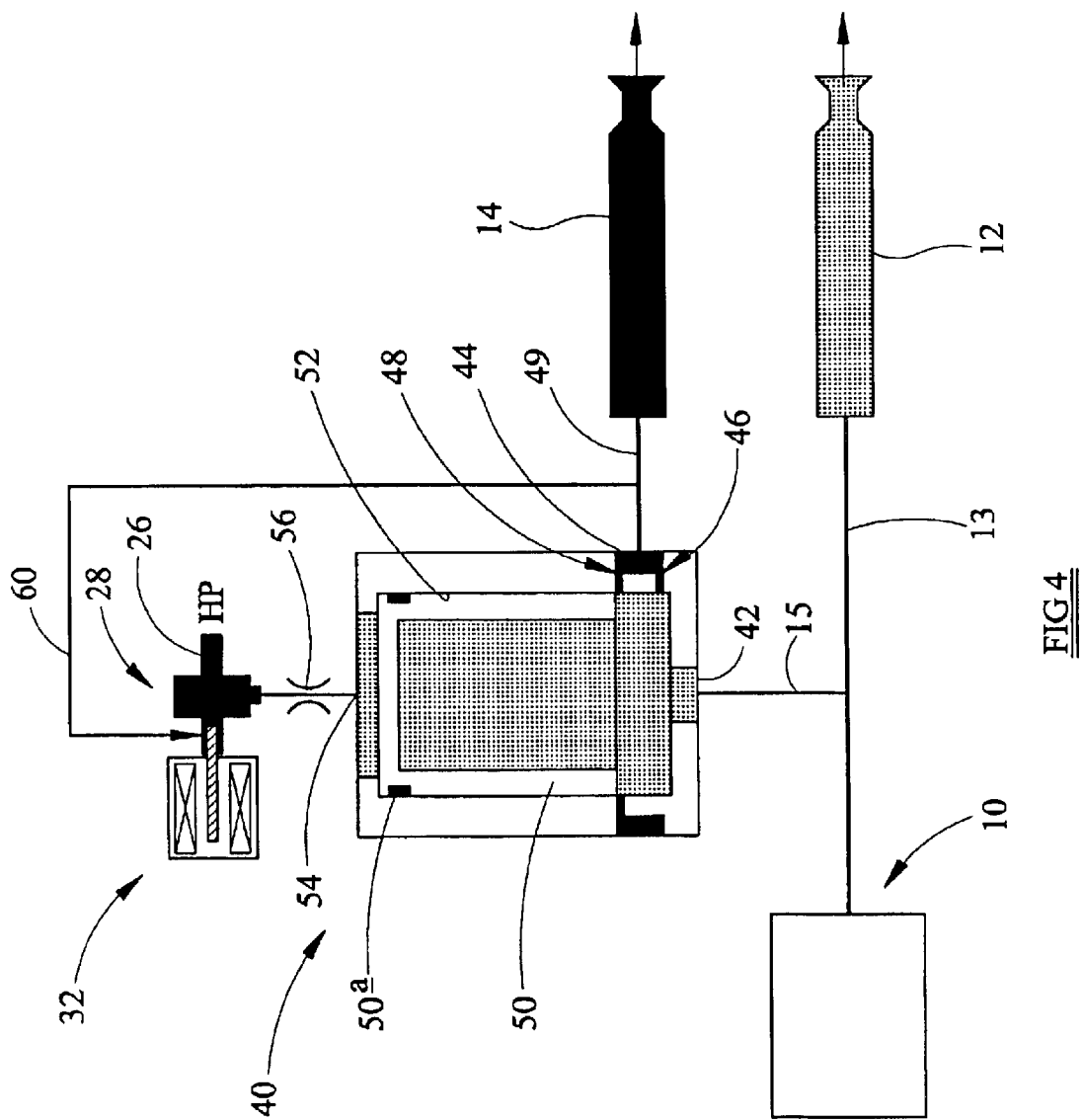
FIG. 4 is a schematic representation of a staged gas turbine engine injector system according to the present invention having a second stage valve in a fully open position.

Referring now to FIGS. 2, 3 and 4, in this embodiment the staged gas turbine engine fuel injector system comprises a fuel metering unit 10, supplying a continuous flow of fuel directly to a group of first stage fuel injectors 12 via a passage 13, and to a group of second stage fuel injectors 14 through a branch passage 15 provided with a second stage valve 40.

The second stage valve 40 comprises a first fuel supply passage or inlet 42 supplied with fuel from the fuel metering unit 10, a fuel outlet or outlet passage 44, having first and second outlet ports 46, 48, the first outlet port 46 having a greatly reduced cross section compared to the second outlet port 48. The outlet ports 46, 48 supply fuel via a common line 49 to the second stage fuel injectors 14. The valve 40 also comprises a valve member in the form of a piston 50 having a piston seal 50a positioned toward one end, the piston 50 being slidingly mounted in a valve chamber 52 so as to allow or prevent the flow of fuel from the first fuel supply passage 42 to the fuel outlet 44. The valve 40 further comprises a second fuel supply passage 54, having a region of reduced cross section 56, positioned on the opposite side of the piston 50 to the first fuel supply passage 42. High-pressure fuel line 26 is connected via ball valve 28 to the second fuel supply passage 54. An auxiliary fuel line 60 is connected to the second fuel supply passage 54 via the ball valve 28 and is joined to the common line 49 downstream of the fuel outlet 44. Solenoid 32 controls the movement of the ball valve 28 in the manner described previously with reference to FIG. 1 so that, in a first position of the ball, fuel can flow from the high pressure fuel line 26 to the valve chamber 52, but is prevented from flowing into the auxiliary fuel line 60. In a second position of the ball, the ball valve 28 prevents fuel from flowing from the high-pressure fuel line 26 to the valve chamber 52, but allows fuel to flow from the valve chamber 52 to the auxiliary fuel line 60.

Referring now to FIG. 2, when the second stage fuel injectors 14 are not in use, the solenoid 32 is de-energised and the ball in the ball valve 28 is urged by the pressure in line 26 into its first position in which fuel from the high pressure fuel line 26 can flow into the valve chamber 52 via the second fuel supply passage 54. In this configuration, fuel is prevented by the ball of the ball valve 28 from entering the auxiliary fuel line 60 and flowing to the second stage fuel injectors 14. Fuel from the high-pressure fuel line 26 is at a higher pressure than that supplied from the fuel metering unit 10. As a result of the pressure differential, the piston 50 moves to a first position in the valve chamber 52 distal to the second fuel supply passage 54. In this position, the piston 50 prevents flow of fuel from the fuel metering unit 10 through the outlet ports 46, 48 to the second stage fuel injectors 14. These are shown purged of fuel so as to prevent the build up of carbon deposits that may lead to blockages.

Referring now to FIGS. 3 and 4, when the second stage fuel injectors 14 are required, for example during periods of greater thrust, the solenoid 32 is energised to cause the ball of the ball valve 28 to be urged against a force due to high pressure fuel within the fuel line 26 into its second position in which flow of fuel from the high-pressure fuel line 26 to the valve chamber 52, via the second fuel supply passage 54, is prevented. When the ball valve is in the second position, the auxiliary fuel line 60 is opened and the pressure on the top of the piston 50 is relieved, with the result that the piston 50 is urged into a second position toward the opposite end of the valve chamber 52 under the force exerted upon it by the fuel from the fuel metering unit 10. The rate at which the piston 50 can move within the valve chamber 52 is limited by the restriction 56 in the second fuel supply passage 54. Fuel displaced from the valve chamber 52 passes back through the second fuel supply passage 54 and along the auxiliary fuel line 60 to the common line 49. The fuel then flows to the second stage fuel injectors 14 and begins priming. As the piston 50 moves along the valve chamber 52, a position will be reached in which the first outlet port 46, having a relatively small cross section, will be exposed to fuel from the fuel metering unit 10 (FIG. 3). Fuel will flow from the first outlet port 46 along the common line 49 to the second stage fuel injectors 14 to fully prime them. As the volume of fuel which flows through the first outlet port 46 is low, no significant loss in power to the first stage fuel injectors 12 occurs.

As the piston 50 moves further along the valve chamber 52 into its second position, under the influence of the pressure of fuel from the fuel metering unit 10, the second outlet port 48, having a relatively large cross section, becomes exposed to the fuel from the fuel metering unit 10. Fuel can then flow freely to the second stage fuel injectors 14 to provide the required additional thrust without loss of fuel flow to the first stage injectors 12 due to priming. At this stage, the fuel flow to the first and second stage injectors is determined by the restrictions of the respective injectors.

When the second stage fuel injectors 14 are no longer required, the solenoid 32 is de-energised, resulting in the ball of the ball valve 28 being urged back into its first position by the pressure of fuel from the high pressure fuel line 26. Fuel from the high pressure fuel line 26 enters the valve chamber 52 causing the piston 50 to return to its first position in which fuel from the fuel metering unit 10 cannot enter either of the outlet ports 46, 48 of the fuel outlet 44.

It will be understood that by carefully controlling the sizes of the restriction 56 and the first and second outlet ports 46, 48 and the volume of fuel displaced by the piston as it travels the axial distance between the ports 46, 48, complete priming of the second stage fuel injectors can be achieved without loss of power to the first stage fuel injectors due to diverted fuel flow independent of the fuel pressure at the outlet of the fuel metering unit 10.

What is claimed is:

1. A fuel injection system for a combustion engine, comprising:
    a fuel metering unit for providing a metered supply of pressurised fuel,
    at least one first fuel injector,
    at least one second fuel injector,
    a fuel supply passage arrangement for supplying fuel from the fuel metering unit to the at least one first fuel injector and the at least one second fuel injector,
    the fuel supply passage arrangement including a first valve for controlling the flow of fuel from the fuel metering unit to the at least one second fuel injector,
    the first valve having a fuel inlet communicating with the fuel metering unit, a fuel supply outlet communicating with the at least one second injector, and a fuel control valve member moveable between a first position in which flow of fuel from the fuel inlet to the fuel supply outlet is prevented and a second position in which the flow of fuel from the fuel inlet to the fuel supply outlet is permitted, and
    means for controlling movement of the valve member, wherein the first valve has a fuel priming outlet communicating with the at least one second fuel injector, the fuel priming outlet being positioned relative to the fuel inlet and the valve member so that
        (a) the flow of fuel from the fuel inlet to the priming outlet is prevented when the valve member is in its first position, and (b) the flow of fuel from the fuel inlet to the fuel priming outlet is permitted before the valve member reaches its second position.

2. A fuel injection system as claimed in claim 1, wherein the means for controlling movement of the valve member between its first position and its second position includes means for supplying pressurised fluid to an opposite side of the valve member to the fuel from the fuel inlet.

3. A fuel injection system according to claim 2, wherein the means for supplying pressurised fluid includes a further valve.

4. A fuel injection system according to claim 3, wherein the further valve has at least a first port communicating with a pressurised fluid supply, and a second port communicating with the first valve.

5. A fuel injection system according to claim 4, wherein the valve has a third port which is capable of communicating with the second port.

6. A fuel injection system according to claim 5, wherein the third port further communicates with the at least one second injector.

7. A fuel injection system according to claim 3, wherein the further valve is controllable so that (a), in a first condition of the further valve, the third port is closed and the first port is connected to the first valve via the second port whereby, in use, the pressurised fuel from the pressurised fuel supply urges the valve member of the first valve into its first position, and (b), in a second condition of the further valve, the first port is closed and the second and third ports are in communication so that, in use, the valve member of the first valve can move from its first position to its second position and thereby displace fuel through the second and third ports to the at least one second injector during travel of the valve member towards its second position.

8. A fuel injection system for a combustion engine, comprising:
   a fuel metering unit for providing a metered supply of pressurised fuel,
   at least one first fuel injector,
   at least one second fuel injector,
   a fuel supply passage arrangement for supplying fuel from the fuel metering unit to the at least one first fuel injector and the at least one second fuel injector,
   the fuel supply passage arrangement including a first valve for controlling the flow of fuel from the fuel metering unit to the at least one second fuel injector,
   the first valve having a fuel inlet communicating with the fuel metering unit, a fuel supply outlet communicating with the at least one second injector, and a fuel control valve member moveable between a first position in which flow of fuel from the fuel inlet to the fuel supply outlet is prevented and a second position in which the flow of fuel from the fuel inlet to the fuel supply outlet is permitted, and
   control means for controlling movement of the valve member, wherein the control means includes a further valve having a first port communicating in use with a pressurised fuel supply, a second port communicating with the first valve, and a third port communicating with the at least one second injector, wherein the further valve is controllable so that (a), in a first condition of the further valve, the third port is closed and the first port is connected to the first valve via the second port whereby, in use, the pressurised fuel from the pressurised fuel supply urges the valve member of the first valve into its first position, and (b), in a second condition of the further valve, the first port is closed and the second and third ports are in communication so that, in use, the valve member of the first valve can move from its first position to its second position and thereby displace fuel through the second and third ports to the at least one second injector during travel of the valve member towards its second position.

9. A fuel injection system according to claim 1, wherein the fuel control valve member is in the form of a piston moveable within a piston chamber.

10. A fuel injection system according to claim 9, wherein damping means is provided for damping movement of the piston from its first position to its second position.

11. A fuel injection system according to claim 3, wherein said further valve is a ball valve.

12. A fuel injection system according to claim 4, wherein a line connecting the second port with the first control valve member contains a flow restriction.

13. A fuel injection system according to claim 12, wherein the flow restriction is a unidirectional flow restriction.

14. A fuel injection system according to claim 3, wherein the fuel control system includes means for changing the condition of said further valve.

* * * * *